United States Patent Office 3,267,087
Patented August 16, 1966

3,267,087
POLYMERIZATION CATALYST
Clifford W. Childers, Wayne, N.J., assignor to United States Rubber Company, New York, N.Y., a corporation of New Jersey
No Drawing. Filed Jan. 15, 1963, Ser. No. 251,490
14 Claims. (Cl. 260—94.3)

This invention relates to a catalyst for the polymerization of butadiene-1,3, hereinafter sometimes called butadiene, to a rubbery high molecular weight polybutadiene in which more than 60% of the monomer units have cis-1,4 structure, and to the polymerization of butadiene with such catalyst. The term high molecular weight polybutadiene refers to a polymer having a dilute solution viscosity of at least 0.1 in benzene which would correspond approximately to a number average molecular weight of at least 10,000.

The catalyst of the present invention is a mixture of a bis-trialkylphosphine-nickel diiodide complex or a bis-tricycloalkylphosphine-nickel diiodide complex, $KBH_4$ or $NaBH_4$ (alkali-metal borohydride), and acetylene in an inert liquid reaction medium. The bis-trialkylphosphine-nickel diiodide complex and the bis-tricycloalkylphosphine-nickel diiodide complex have the generic formula $(R_3P)_2NiI_2$ wherein R represents an alkyl radical having 3 to 8 carbon atoms, e.g., propyl, isopropyl, n-butyl, isobutyl, hexyl, octyl, or a cycloalkyl radical having 5 to 8 carbon atoms, e.g., cyclopentyl, cyclohexyl, cyclooctyl. Bis-(tri-n-butyl)phosphine-nickel diiodide is the present preferred phosphine-nickel diiodide complex. In the catalyst mixture, the mole ratio of nickel to alkali metal (potassium or sodium) may be in the range of 10:1 to 1:10, and the mole ratio of nickel to acetylene may be in the range of 1:5 to 1:0.5. The reaction medium may be a non-polar aromatic or aliphatic solvent, e.g., benzene, xylene, toluene, heptane, hexane, cyclohexane, octane, or a mixture of such a non-polar solvent with up to 75% of the mixture of a polar solvent, e.g., an alkanol having 1 to 8 carbon atoms or a cycloalkanol having 5 to 8 carbon atoms, e.g., methanol, ethanol, butanol, hexanol, cyclohexanol, octanol. The weight ratio of butadiene to the solvent reaction medium may be in the range of 1:20 to 1:1. The concentration of catalyst in the polymerization reaction mixture, which includes the butadiene and solvent reaction medium, may be in the range of 0.001% to 1% based on the nickel content of the catalyst mixture. In carrying out the polymerization reaction, the butadiene, solvent reaction medium, phosphine-nickel diiodide complex, and alkali-metal borohydride are mixed together, and the acetylene is then added. The temperature of polymerization is not critical and may range from −20° C. to 100° C. The catalyst of the present invention differs from previous cis-polybutadiene catalysts in that it is effective in reaction media comprising polar solvents, in which the polybutadiene precipitates from solution as it is formed, producing a fluid suspension. This facilitates removal of heat of polymerization since the viscosity of the reaction mixtures does not build up as it does in polymerizations where the polymer is soluble. This feature is especially advantageous for temperature control in large scale equipment.

The following examples illustrate the invention. All parts, percentages and ratios referred to herein, unless otherwise noted, are by weight.

Example 1

The bis-(tri-n-butyl)phosphine-nickel diiodide complex was prepared in known manner by mixing tri-n-butyl phosphine and nickel iodide in mole ratio of 2:1 in ethanol solution. The ethanol solvent was removed by vacuum distillation leaving a dark green semi-rigid mass. The yield of $[(n\text{-butyl})_3P]_2NiI_2$ was practically 100% of the starting materials.

One-half gram of $[(n\text{-butyl})_3P]_2NiI_2$ (.0007 mole) and 0.1 g. of $KBH_4$ (.00185 mole) were mixed under nitrogen in 200 ml. of a mixed solvent consisting of 100 ml. benzene and 100 ml. of ethanol in a soda bottle of approximately 700 ml. capacity. Fifty grams of dried liquid butadiene was added to the bottle and it was capped. One gram of acetylene gas (.00384 mole) was then added by means of a hypodermic needle inserted through the self-sealing rubber bottle gasket. After standing at room temperature for 16 hours, 0.4 g. of black rubbery high molecular weight polybutadiene was filtered from the solution. An infrared spectrum of a portion of the polymer dissolved in $CS_2$ revealed strong polybutadiene bands with relative amounts of cis-1,4, trans-1,4, and 1,2 structure being 74%, 20% and 6% respectively.

Example 2

This polymerization was the same as Example 1 except 0.1 g. of $[(n\text{-butyl})_3P]_2NiI_2$ (.00014 mole) was used instead of 0.5 g. About 1 g. of rubbery high molecular weight polybutadiene was recovered which had 80% cis-1,4, 15% trans-1,4 and 5% 1,2 structure.

Example 3

This polymerization was the same as Example 1 except 1 g. of $[(n\text{-butyl})_3P]_2NiI_2$ (.0014 mole) was used instead of 0.5 g., and 0.01 g. of $KBH_4$ (.000185 mole) was used instead of 0.1 g. About 1 gram of rubbery high molecular weight polybutadiene was recovered which had 78% cis-1,4, 16% trans-1,4 and 6% 1,2 structure.

Example 4

This polymerization was the same as Example 1 except 1 g. of $[(n\text{-butyl})_3P]_2NiI_2$ (.0014 mole) was used instead of 0.5 g., 0.2 g. of $NaBH_4$ (.0053 mole) was used instead of 0.1 g. of $KBH_4$, and 0.5 g. of acetylene (.00192 mole) was used instead of 1 g. About 2.2 g. of rubbery high molecular weight polybutadiene was recovered which had 80% cis-1,4, 15% trans-1,4 and 5% 1,2 structure.

Example 5

This polymerization was the same as Example 1 except 200 ml. of benzene was used instead of 100 ml. of benzene and 100 ml. of ethanol as the solvent reaction medium. The polybutadiene was coagulated from the benzene solution by addition of alcohol. About one gram of rubbery high molecular weight polybutadiene was recovered which had 80% cis-1,4 structure.

In view of the many changes and modifications that may be made without departing from the principles underlying the invention, reference should be made to the appended claims for an understanding of the scope of the protection afforded the invention.

Having thus described my invention, what I desire to claim and protect by Letters Patent is:

1. A process for producing a rubbery polymer of butadiene-1,3 which comprises contacting under polymeriza-

3 tion conditions butadiene-1,3 with a polymerization catalyst prepared by mixing a compound having the generic formula $(R_3P)_2NiI_2$ wherein R represents a radical selected from the group consisting of alkyl radicals having 3 to 8 carbon atoms and cycloalkyl radicals having 5 to 8 carbon atoms with an alkali-metal borohydride selected from the group consisting of $KBH_4$ and $NaBH_4$, and acetylene, said acetylene being added last.

2. A process for producing a rubbery polymer of butadiene-1,3 which comprises contacting under polymerization conditions butadiene-1,3 with a polymerization catalyst prepared by mixing $[(n\text{-butyl})_3P]_2NiI_2$, $KBH_4$, and acetylene, said acetylene being added last.

3. A process for producing a rubbery polymer of butadiene-1,3 which comprises contacting under polymerization conditions butadiene-1,3 with a polymerization catalyst prepared by mixing $[(n\text{-butyl})_3P]_2NiI_2$, $NaBH_4$, and acetylene, said acetylene being added last.

4. A process for producing a rubbery polymer of butadiene-1,3 which comprises contacting under polymerization conditions butadiene-1,3 with a polymerization catalyst prepared by mixing a compound having the generic formula $(R_3P)_2NiI_2$ wherein R represents a radical selected from the group consisting of alkyl radicals having 3 to 8 carbon atoms and cycloalkyl radicals having 5 to 8 carbon atoms with an alkali-metal borohydride selected from the group consisting of $KBH_4$ and $NaBH_4$, and acetylene, said acetylene being added last and the mole ratio of nickel to alkali-metal being in the range of 1:10 to 10:1, and the mole ratio of nickel to acetylene being in the range of 1:5 to 1:0.5.

5. A process for producing a rubbery polymer of butadiene-1,3 which comprises contacting under polymerization conditions butadiene-1,3 with a polymerization catalyst prepared by mixing $[(n\text{-butyl})_3P]_2NiI_2$, $KBH_4$, and acetylene, said acetylene being added last and the mole ratio of nickel to potassium being in the range of 1:10 to 10:1, and the mole ratio of nickel to acetylene being in the range of 1:5 to 1:0.5.

6. A process for producing a rubbery polymer of butadiene-1,3 which comprises contacting under polymerization conditions butadiene-1,3 with a polymerization catalyst prepared by mixing $[(n\text{-butyl})_3P]_2NiI_2$, $NaBH_4$, and acetylene, said acetylene being added last and the mole ratio of nickel to sodium being in the range of 1:10 to 10:1, and the mole ratio of nickel to acetylene being in the range of 1:5 to 1:0.5.

7. A process for producing a rubbery polymer of butadiene-1,3 which comprises contacting butadiene-1,3 with an organic solvent, and a polymerization catalyst prepared by mixing a compound having the generic formula $(R_3P)_2NiI_2$ wherein R represents a radical selected from the group consisting of alkyl radicals having 3 to 8 carbon atoms and cycloalkyl radicals having 5 to 8 carbon atoms with an alkali-metal borohydride selected from the group consisting of $KBH_4$ and $NaBH_4$, and acetylene, said acetylene being added last.

8. A process for producing a rubbery polymer of butadiene-1,3 which comprises contacting butadiene-1,3 with an organic solvent, and a polymerization catalyst prepared by mixing a compound having the generic formula $(R_3P)_2NiI_2$ wherein R represents a radical selected from the group consisting of alkyl radicals having 3 to 8 carbon atoms and cycloalkyl radicals having 5 to 8 carbon atoms with an alkali-metal borohydride selected from the group consisting of $KBH_4$ and $NaBH_4$, and acetylene, said acetylene being added last and the mole ratio of nickel to alkali-metal being in the range of 1:10 to 10:1, and the mole ratio of nickel to acetylene being in the range of 1:5 to 1:0.5.

9. A process for producing a rubbery polymer of butadiene-1,3 which comprises contacting butadiene-1,3 with an organic solvent, and a polymerization catalyst prepared by mixing a compound having the generic formula $(R_3P)_2NiI_2$ wherein R represents a radical selected from

4 the group consisting of alkyl radicals having 3 to 8 carbon atoms and cycloalkyl radicals having 5 to 8 carbon atoms with an alkali-metal borohydride selected from the group consisting of $KBH_4$ and $NaBH_4$, and acetylene, said acetylene being added last and said organic solvent being selected from the group consisting of non-polar solvents and mixtures of non-polar solvents with up to 75% of said mixtures of polar solvents.

10. A process for producing a rubbery polymer of butadiene-1,3 which comprises contacting butadiene-1,3 with an organic solvent, and a polymerization catalyst prepared by mixing a compound having the generic formula $(R_3P)_2NiI_2$ wherein R represents a radical selected from the group consisting of alkyl radicals having 3 to 8 carbon atoms and cycloalkyl radicals having 5 to 8 carbon atoms with an alkali-metal borohydride selected from the group consisting of $KBH_4$ and $NaBH_4$, and acetylene, said acetylene being added last and with said organic solvent being selected from the group consisting of benzene and mixtures of benzene with up to 75% of said mixtures of ethanol.

11. A process for producing a rubbery polymer of butadiene-1,3 which comprises contacting butadiene-1,3 with an organic solvent, and a polymerization catalyst prepared by mixing a compound having the generic formula $(R_3P)_2NiI_2$ wherein R represents a radical selected from the group consisting of alkyl radicals having 3 to 8 carbon atoms and cycloalkyl radicals having 5 to 8 carbon atoms with an alkali-metal borohydride selected from the group consisting of $KBH_4$ and $NaBH_4$, and acetylene, said acetylene being added last and the mole ratio of nickel to alkali-metal being in the range of 1:10 to 10:1, and the mole ratio of nickel to acetylene being in the range of 1:5 to 1:0.5, said organic solvent being selected from the group consisting of non-polar solvents and mixtures of non-polar solvents with up to 75% of said mixtures of polar solvents, the weight ratio of butadiene-1,3 to said organic solvent being in the range of 1:20 to 1:1.

12. A process for producing a rubbery polymer of butadiene-1,3 which comprises contacting butadiene-1,3 with an organic solvent, and a polymerization catalyst prepared by mixing a compound having the generic formula $(R_3P)_2NiI_2$ wherein R represents a radical selected from the group consisting of alkyl radicals having 3 to 8 carbon atoms and cycloalkyl radicals having 5 to 8 carbon atoms with an alkali-metal borohydride selected from the group consisting of $KBH_4$ and $NaBH_4$, and acetylene, said acetylene being added last and the mole ratio of nickel to alkali-metal being in the range of 1:10 to 10:1, and the mole ratio of nickel to acetylene being in the range of 1:5 to 1:0.5, said organic solvent being selected from benzene and mixtures of benzene with up to 75% of said mixtures of ethanol, the weight ratio of butadiene-1,3 to said organic solvent being in the range of 1:20 to 1:1.

13. A process for producing a rubbery polymer of butadiene-1,3 which comprises contacting butadiene-1,3 with an organic solvent, and a polymerization catalyst prepared by mixing a compound having the generic formula $(R_3P)_2NiI_2$ wherein R represents a radical selected from the group consisting of alkyl radicals having 3 to 8 carbon atoms and cycloalkyl radicals having 5 to 8 carbon atoms, an alkali-metal borohydride selected from the group consisting of $KBH_4$ and $NaBH_4$, and acetylene, said acetylene being added last and the mole ratio of nickel to alkali-metal being in the range of 1:10 to 10:1, and the mole ratio of nickel to acetylene being in the range of 1:5 to 1:0.5, said organic solvent being selected from the group consisting of non-polar solvents and mixtures of non-polar solvents with up to 75% of said mixtures of polar solvents, the weight ratio of butadiene-1,3 to said organic solvent being in the range of 1:20 to 1:1, the amount of catalyst, based on the nickel content, being in the range of 0.001% to 1% of the polymerization reaction mixture.

14. A process for producing a rubbery polymer of butadiene-1,3 which comprises contacting butadiene-1,3 with an organic solvent, and a polymerization catalyst prepared by mixing a compound having the generic formula $(R_3P)_2NiI_2$ wherein R represents a radical selected from the group consisting of alkyl radicals having 3 to 8 carbon atoms and cycloalkyl radicals having 5 to 8 carbon atoms, an alkali-metal borohydride selected from the group consisting of $KBH_4$ and $NaBH_4$, and acetylene, said acetylene being added last and the mole ratio of nickel to alkali-metal being in the range of 1:10 to 10:1, and the mole ratio of nickel to acetylene being in the range of 1:5 to 1:0.5, said organic solvent being selected from benzene and mixtures of benzene with up to 75% of said mixtures of ethanol, the weight ratio of butadiene-1,3 to said organic solvent being in the range of 1:20 to 1:1, the amount of catalyst, based on the nickel content, being in the range of 0.001% to 1% of the polymerization reaction mixture.

References Cited by the Examiner
UNITED STATES PATENTS 3,131,155    4/1964    Luttinger _____ 260—94.3

JAMES A. SEIDLECK, *Primary Examiner.*

JOSEPH L. SCHOFER, L. EDELMAN, *Examiners.*